Dec. 16, 1969   P. CHWASCIAK   3,484,120

BUSINESS FORM LAYOUT SPECIFICATION SHEET

Filed Nov. 20, 1967   3 Sheets-Sheet 1

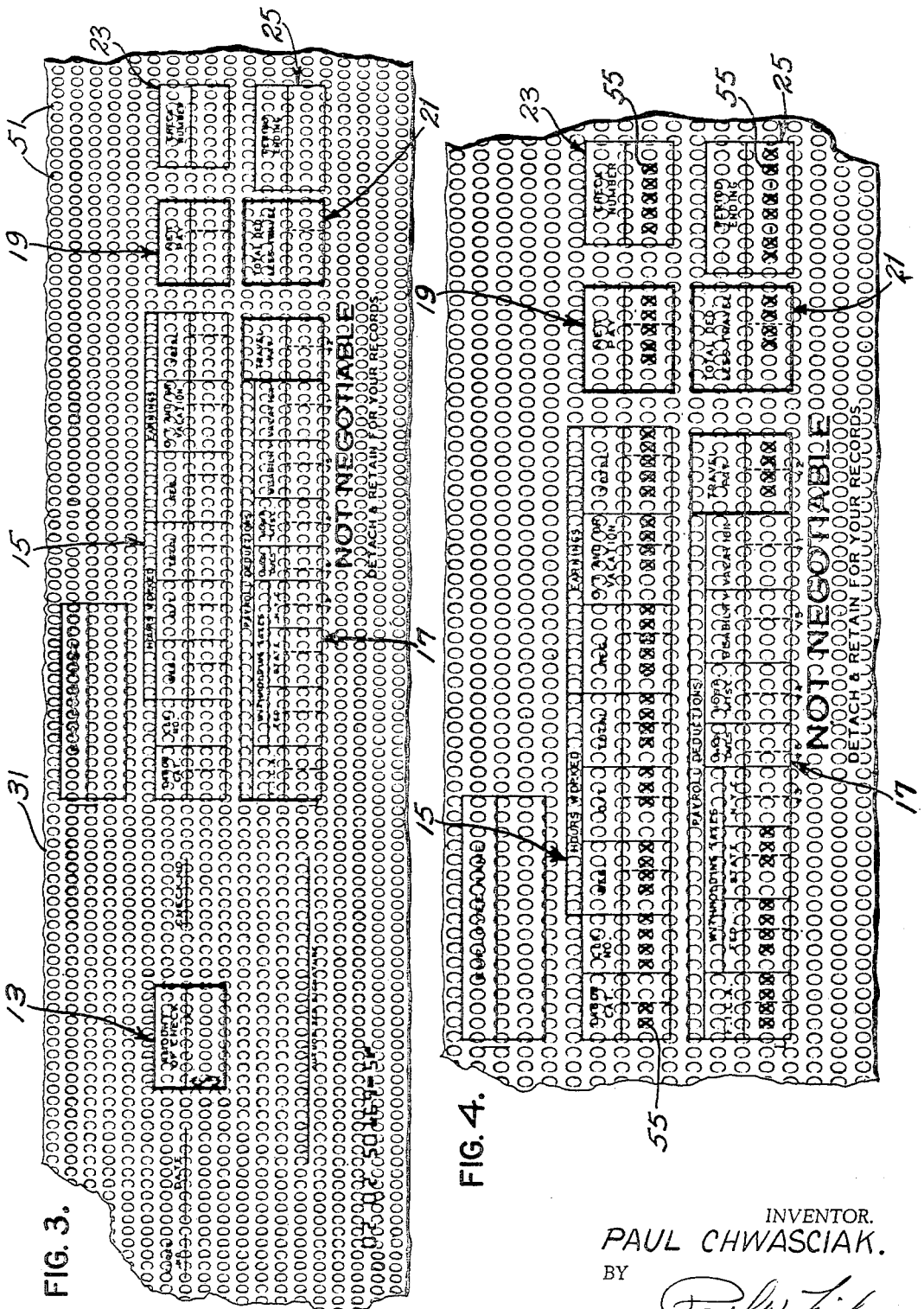

United States Patent Office 3,484,120
Patented Dec. 16, 1969

3,484,120
BUSINESS FORM LAYOUT SPECIFICATION SHEET
Paul Chwasciak, Webster, N.Y., assignor to Burroughs Corporation, Detroit, Mich., a corporation of Michigan
Filed Nov. 20, 1967, Ser. No. 684,360
Int. Cl. G06k 19/00
U.S. Cl. 283—56                    2 Claims

ABSTRACT OF THE DISCLOSURE

A method and article of manufacture usable in the preparation of copy specifications for printing of business forms. In accordance with the preferred embodiment of the present invention, a matrix-type array or pattern of unconnected indicia are dimensioned, configured and arranged relative to a structural reference point on the sheet to accurately indicate on the specification layout sheet the spacing requirements of the posting mechanism of the machine on which business forms prepared from the specification layout sheet are intended for use.

BRIEF DESCRIPTION OF INVENTION

This invention relates to a method and article of manufacture for preparing specifications for business forms and more particularly to an improved layout specification sheet for characterizing the appropriate dimensioning and location of the fields and printing on a business forms layout specification sheet as a function of the spacing requirements of a particular posting mechanism.

BACKGROUND

As is known, the majority of business form employed today are pre-printed and the appropriate information entries are made at preselected positions on the form in accordance with the particular users requirements and respective business transactions. In the normal course of events, a salesman determines the format of a business form in accordance with a customer's particular needs and communicates this information to the business form manufacturer. The manufacturer then pre-prints the form in accordance with the customer's desired format. As will be appreciated by those skilled in the art, it is necessary that the layout specifications of the form to be prepared must accurately conform to the spacing requirements of the posting mechanism on which the pre-printed forms are to be used. This requirement for layout specification accuracy is particularly true whenever the pre-printed forms are intended for use on automatic posting mechanisms such as computers, data processors, and the like.

Prior art methods for designing layout specification sheets of which applicant is aware have generally involved a grid like structure of horizontal and vertical lines. The spacing between the horizontal and vertical grid lines was dimensioned to indicate the spacing requirements of the posting machine on which printed business forms prepared from such specifications were intended to be used.

It has been applicant's experience that salesmen, and particularly those salesmen relatively unskilled in the art, are generally unable to properly correlate the grid spacing to the spacing requirements of the posting or printing mechanism. In general it has been found that because of misunderstanding and mistakes by the salesmen, many of the forms prepared from such layout specification sheets were not properly dimensioned resulting in misplacing the field designating lines and printing relative to designated fields. This misalignment or improper designation of the spacing tolerance often results in a pre-printed business form which is unacceptable for use with the intended posting mechanism. Whenever the spacing requirements of the posting mechanism are not properly taken into account the resulting business form when completed, it often unusable because the information filled into the form will be either illegible or erroneous in part because certain entries overlap or overlay various ones of the ruled lines of the designated fields.

Another problem which is commonly encountered by salesmen employing the prior art methods for specifying the preparation of copy for printing of business forms has involved properly spacing the information to be printed on the form. In using specification layout sheets which employ horizontal and vertical spaced grid like lines for indicating the spacing requirements of the posting mechanism, it is generally difficult to properly visualize the spacing and orientation of the completed form. It is likewise generally difficult for an inexperienced business forms salesman to visualize the strike line, i.e., the spaces which will be printed, and its relationship to adjacent ruled lines and printed material. The user of such layout specification forms must understand and constantly observe the spacing requirements of the posting mechanism for whenever one error is made, it may be perpetuated throughout the form thus resulting in a pre-printed form which does not correspond to the requirements of the posting mechanism of the machine on which the form is to be used.

It is, therefore, an object of the present invention to provide an improved method and article of manufacture for specifying the print spacing requirements on a business form specification sheet which accurately correspond with and visually illustrate the spacing requirements of a posting mechanism on which the pre-printed forms will be used. It is a further object of the present invention to simplify the use of a business forms layout specification sheet.

It is a still further object of the present invention to provide an improved, universal business forms layout sheet which is easily understood.

It is yet another object of the present invention to provide an accurate layout specification sheet for preparation of copy for printed business forms which reduces production tolerances and thereby reduces manufacturing costs.

In accomplishing the above objects and other desirable aspects applicant has invented an improved method and article of manufacture which accurately communicates to the user the spacing requirements of a particular posting mechanism on which a form prepared from the layout specification sheet is to be used. In accordance with the preferred embodiment of applicant's invention, a plurality of visible, unconnected indicia are arranged in a predetermined pattern oriented relative to a reference mark on the specification section of the universal business form layout sheet. The reference mark may comprise a ruled line or an edge of the sheet. The indicia, which in the preferred embodiment comprises an alpha character, are of like dimensions and spaced apart a distance corresponding to the spacing requirements of the posting mechanism on which the pre-printed business form to be prepared from the layout is to be employed.

Utilizing the printed indicia to indicate allowable spacing on the layout form in relationship to a desired format, aids the salesman in quickly and accurately describing the proper location and dimensioning of the various delineated fields of the desired format. Applicant's method and universal specification layout sheet assure that the information printed on the pre-printed form, by the automatic posting mechanism on which the form is to be used, will be properly positioned within the respective fields and further that the various fields and information posted therein will be as uncongested as possible.

For a more complete understanding of applicant's improved method and universal layout sheet, reference may be had to the following detailed description in conjunction with the drawings wherein:

FIG. 1 illustrates a portion of a check stub having a plurality of printing or spacing errors thereon due to layout specification errors in the designation of the location of the various delineated fields and printing therein.

FIG. 2 shows a portion of a universal layout sheet embodying the principles of the present invention.

FIG. 3 is a partial view of a portion of applicant's layout sheet having designated fields ruled thereon.

FIG. 4 is an enlarged view of a portion of the layout sheet illustrated in FIG. 3 completed in accordance with one aspect of the principles of the present invention.

FIG. 5 illustrates a check stub similar to that shown in FIG. 1 with the entries properly positioned in accordance with the selected printing position designations as shown in FIG. 4.

Referring now to FIG. 1 there is shown a check stub 11. The check (not shown) and check stub 11 may be prepared by any known printing method in which the various delineated fields 13, 15, 17, 19, 21, 23 and 25 are formed, dimensioned and captioned for accounting and/or record purposes. Field 13 is captioned "Amount of Check" and it is seen that in this particular check stub it is designed to accommodate a maximum of four printed digits to the left of the decimal point indicating line 27 and two places to the right of the decimal line 27.

As shown in FIG. 1, several of the digits and numbers 26, 26', 26'', 26''', 26'''' entered in the various delineated fields 13-25 are partly or totally obscured because of an overprint with or onto various lines of the pre-printed form. As a result of this overprinting, for example, the amount of a check printed in field 13, the clock number printed in field 15 and the various entries made in other boxes are ambiguous and unclear. This, of course, makes it difficult to accurately read the information printed on the check stub and as in the instance of the amount of the check in field 13 it may change this value as much as an order of magnitude. The respective errors in this illustration arise from an error in the specification sheet by which the specification of desired strike lines for various printed entries is off by as little as a factor of one-half the printing space. Particularly in preparing forms for the banking industry, such as checks and check stubs, this type error is totally unsatisfactory since the printing entries made therein are subject to a wrong interpretation. Thus even a slight error in the form layout specification sheet results in a pre-printed form prepared from the specification sheet which is compatible with the spacing requirements of the printing or posting mechanism of the machine on which the pre-printed form is intended for use.

Figure 2:
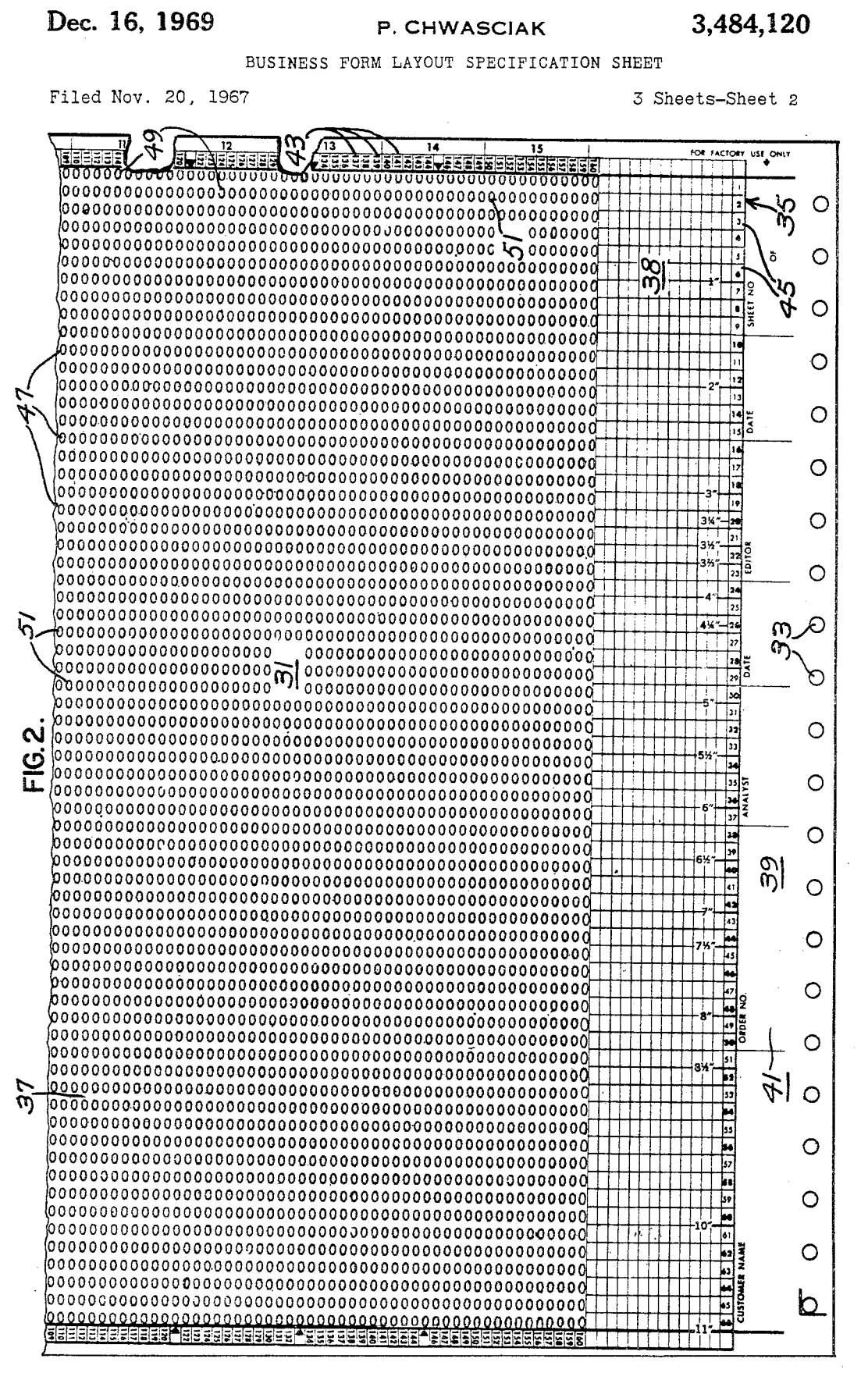

Referring now to FIG. 2 there is shown a universal layout specification sheet 31 embodying the principles of the present invention. As shown, feed apertures or holes 33 are located or may be designated at the edge of the form sheet 31. A like row of apertures would be located on the opposite side of the form, however, these are not shown as they would be similar to the row 33 shown. Line 35 divides the layout sheet into a specification section 37 and a caption section 39. The caption section 39 is preferably ruled and divided to provide blocks 41 for various headings identifying the customer's name, order, date, and other pertinent information. The layout specification section 37 may have rows of ruled marks or numbers 43 on opposite edges thereof which indicate the various print column numbers of the layout sheet. Similarly numerals 45 may appropriately identify the various row numbers in accordance with the spacing requirements of the posting mechanism on which the finished form will be used. Ruled section 38 of specification section 37 may be included for the convenience of the user, however, it is preferred in accordance with the principles of applicant's invention that specification section 37 be totally imprinted therein with a pattern or array of indicia 51. The indicia 51 are dimensioned and spaced apart to correspond with the spacing requirements of the posting mechanism on which the form prepared from the specification layout sheet is intended for use. In accordance with applicant's invention, the pattern of permissible print position indicating indicia is oriented and positioned, in accordance with a predetermined scale factor, relative to a reference mark, for example, ruled line 35 or an edge of the sheet. It is this positional and pattern configured relationship of the indicia relative to the reference position, as distinguished from the intelligence conveyed by the indicia or indicia pattern per se, which characterizes and delineates the appropriate print spacing requirements of a particular posting mechanism.

The illustrated pattern of indicia 51 comprises a matrix of rows 47 and columns 49 of ciphers which clearly delineate the allowable printing positions on the form. While the indicia illustrated in FIG. 2 comprise ciphers printed in a matrix array wherein the ciphers correspond in size to that of the printing mechanism on which the form is to be used, other types of spacing indicating indicia 51 likewise may be used. For example, any alphanumeric character or rows of various, unlike characters or any geometric configuration may be printed in a particular pattern corresponding to the spacing requirements of the posting mechanism on which the form prepared from the layout sheet is intended to be used.

In accordance with the principles of the present invention it is desirable that the space requirement indicating indicia 51 be unconnected so as to clearly convey to the user of the layout form the association spacing and relationship of the various printing positions one to the other. The spacing requirement indicating indicia 51 may be arranged in any form compatible with the spacing requirements of a particular posting mechanism, for example, one-tenth inch by one-sixth inch. By printing a full array in layout section 37 of such indicia 51 it is possible to clearly specify all allowable print positions over the entire layout specification sheet. The respective column and row indicators 43 and 45 aid the user in identifying the row and column position in which the respective fields lie. The spacing between the respective rows and columns of indicia 51 permits the user to clearly visualize the relationship of the desired format in its completed condition, i.e., the form to be prepared for the specification sheet, and to quickly and accurately determine the allowable and/or desirable printing positions. Further, in accordance with the principles of the present invention, it is possible for the user of applicant's universal specification sheet to clearly visualize the strike lines, i.e., the spaces in which the form is to be printed.

Referring now to FIGS. 3 and 4 there is shown a portion of the universal layout sheet 31 in accordance with the principles of the present invention. With reference to FIG. 3 it is seen that appropriate fields 13, 15, 17, 19, 21, 23 and 25 may be ruled on portions of the layout sheet 31 and be appropriately dimensioned to permit a printing therein of the desired number of printing positions. The use of the spacing requirement indicia 51 clearly distinguishes and locates the matter to be printed in the boxes or fields from the ruled lines of the fields. Further by employing as indicia 51 characters of a particular font having considerable vertical and horizontal extent it is possible for the user of applicant's universal layout sheet form to clearly visualize the spacing requirements of the posting mechanism and thus insure that the completed form will not only be within the tolerances required, but will when completed be accurately, as well as artfully, arranged.

As is known in the art when the forms prepared from a specification sheet are intended for use on an automatic computer-type mechanism, the ruled lines and spacing must accurately correspond to the permitted print positions. As hereinabove discussed in conjunction with FIG. 1, any error in designating the position or extent of any of the respective fields results in a crowding appearance of print within the field or even worse in the overprinting or mis-printing of a particular entry relative to a ruled line.

With reference to FIG. 4 there is shown a portion of applicant's universal specification sheet 31 in which the desired printing positions are clearly delineated by marks 55 within the various fields 15–25. Within the various fields 15–25, the user has designated the appropriate number and position of print position entries to be made in each field. As shown, the marks 55 overlaying the indicia 51 aid the user of applicant's universal layout form in clearly visualizing the layout spacing, orientation and position of each designated entry as it will appear on the form as it is made from the completed business form layout sheet.

By employing the pattern of position requirement indicating indicia 51 in accordance with the principles of the present invention, the user of the universal specification sheet is able to quickly and accurately determine the accuracy of designated print positions within, and the dimensioning of each field and to visualize the appearance and spacing of the print entries in each field. By employing the overlay marks 55 to indicate the desired printing position, the user is able to rapidly visualize the exact configuration of the completed form to determine its appearance. By employing an allowable print or stub spacing requirement indicia 51 those alpha characters of the particular font having the greatest vertical and horizontal dimensions, it is possible for the user to accurately determine and visualize the strike position and spacing regardless which of the characters are printed in the respective selected positions.

Referring now to FIG. 5, there is shown a check stub 11 having the same printed information in the various fields 13–25 as that illustrated in the check stub shown in FIG. 1. In FIG. 5 the information is printed in the various print positions as specified on the universal layout sheet shown in FIG. 4 and thus the respective strike lines or printing positions clearly fall within each designated field. By comparing the printed entries of FIG. 5 with those in FIG. 1, it may be seen that all entries in FIG. 5 clearly fall in the desired fields. Thus, in FIG. 5 the amount of the checks shown in field 13 clearly indicates the correct digits to be entered on each side of the decimal point indicating line 27. Further, with reference to the field 15 showing the clock number, it is clear that the clock number is 1002 rather than the ambiguous entry 092 as shown in the corresponding field in FIG. 1. It is readily apparent that with all the strike lines or printing spaces accurately described as on the forms in FIGS. 3 and 4, the printing spacing requirements and thus the various tolerance limits which must be held in the manufacturing process of the business form are greatly reduced. By using the universal layout sheet in accordance with the principles of the present invention the user is able to accurately describe the desired printing positions relative to the spacing requirements of the posting mechanism thereby reducing the change of spacing specification errors.

While the foregoing disclosure is directed to the solution of problems of layout specifications in the preparation of a pre-printed business form it is to be understood that the principles of applicant's invention may be applied to the preparation and specification of other types of pre-printed forms. In light of applicant's disclosure, it will be apparent to those skilled in the art, that various changes, substitutions and other departures from the disclosed method and illustrative embodiments may be made without departing from the scope of the present invention which is described with particularity in the appendant claims.

What is claimed is:

1. A business form layout specification sheet for facilitating the accurate description of printing fields, at least one field to be preprinted and at least one other to be printed by a posting mechanism of a business machine comprising a sheet member, and a pattern of unconnected, visibly recognizable printed indicia on at least a portion of one side of said sheet member, the respective positioning, dimensioning of and spacing between adjacent ones of said indicia corresponding to the spacing requirements of a predetermined posting mechanism, said indicia being alphanumeric characters corresponding in size to the strike area of the characters to be posted, and each of said indicia being substantially centered on a location corresponding to a one of said printing spaces.

2. A method of preparing a business form layout specification sheet for accurately describing acceptable posting spaces on a preprinted business form to be prepared from said layout sheet comprising the steps of, dividing a sheet member into a caption section and a specification layout section, forming a pattern on said specification layout section of unconnected visibly recognizable indicia each substantially centered on a location corresponding to said printing spaces on at least a portion of said specification layout section, the indicia being in the form of alphanumeric characters corresponding in size to the strike area of a character to be posted and spaced apart in accordance with the spacing requirements of a posting mechanism on which forms prepared from said specification layout sheet are to be used, marking said indicia corresponding to those desired printing positions to be printed by a posting mechanism on the preprinted business form to be prepared from said layout sheet, and defining the character fields to be preprinted in relationship to those marked indicia representing printing spaces to be used by the posting mechanism.

References Cited

UNITED STATES PATENTS 1,185,995   6/1916   Gibson et al.

FOREIGN PATENTS 19,440   8/1908   Norway.

LAWRENCE CHARLES, Primary Examiner